July 30, 1957     H. L. THOMPSON     2,801,007
DUAL CLARIFIER
Filed March 26, 1956

INVENTOR.
HENRY LOREN THOMPSON
BY
*Buckhorn and Cheatham*
ATTORNEYS

United States Patent Office 2,801,007
Patented July 30, 1957

2,801,007
DUAL CLARIFIER

Henry Loren Thompson, Portland, Oreg., assignor to Stevens & Thompson, Portland, Oreg., a partnership Application March 26, 1956, Serial No. 573,867

4 Claims. (Cl. 210—320)

This invention relates to a dual clarifier and more particularly to a clarifier having both primary and secondary settling chambers from which the sludge settled in both chambers is removed by a single sludge scraping device and in which the scraping device may be of smaller size than that employed in previous dual clarifiers having the same capacity and in which more effective control over migration of fluid between the chambers is obtained.

The device of the present invention is primarily intended for small or moderate size sewage treating plants although, the device of the present invention has utility in larger sewage treating plants or in any environment where settling of a sludge or other material from water or other liquid is desirably carried out in primary and secondary stages. Many sewage treatment plants include a primary clarifier in which the major portion of the solid material carried in suspension in water is allowed to settle and a separate secondary clarifier in which a second settling operation is carried out after the effluent from the first settling stage has been run through a coarse or rock filter. Both of such clarifiers require a scraping mechanism for moving the sludge along the bottom walls or surfaces of the settling chambers to a sludge discharge port and both are large and relatively expensive pieces of apparatus. Dual clarifiers have been proposed in which a single settling chamber is divided by a diametrically extending partition into a primary settling section and a secondary settling section with a single scraping mechanism arranged to extend over the bottom surfaces of both settling chambers so as to scrape the sludge settled in both chambers to a common discharge port. Such clarifiers have required a sufficiently large scraper mechanism to cover the bottom areas of both settling chambers and undesirable intermixing of the liquids in the two chambers may occur.

In accordance with the present invention, both a primary and secondary settling chamber is provided but a scraping mechanism of a size requisite to scrape the bottom of the primary chamber only is employed. It has been found that the sludge settling in the secondary chamber is sufficiently fluid that it will readily flow, whereas the sludge settling in the primary chamber is relatively stiff and heavy so as to be non-flowable. By constructing the primary and secondary settling chambers so that sludge settling in the secondary chamber will flow down an inclined bottom wall and through openings between the two chambers adjacent their bottom walls, it is possible to produce effective removal of sludge from both chambers with a scraping mechanism of a size which scrapes the bottom wall of the primary chamber only, while at the same time providing a clarifier minimizing the intermixing of the liquids in the two chambers or, if desired, providing for controlled flow of liquids from one chamber into the other.

It is therefore an object of the present invention to provide an improved clarifier in which primary and secondary settling chambers are provided and a minimum of sludge scraping apparatus is required.

Another object of the invention is to provide a clarifier of the type having both a primary and a secondary settling chamber and in which sludge settling in the secondary chamber is discharged by gravity into the primary chamber so as to enable a sludge scraping mechanism to be employed in the primary settling chamber only.

A further object of the invention is to provide a dual clarifier in which primary and secondary settling chambers are provided and in which a single sludge scraping apparatus is required for effective removal of sludge settled in both chambers, while at the same time intermixing of the liquids in the two chambers is minimized or more effectively controlled.

Other objects and advantages of the invention will appear in the following description of a preferred embodiment shown in the attached drawings of which:

Figure 1:
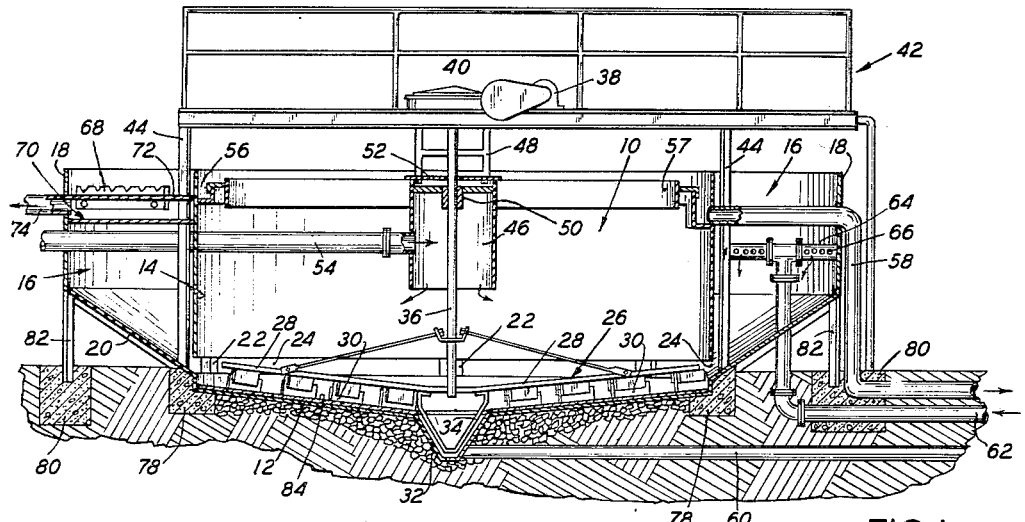
Fig. 1 is a vertical section taken approximately through the center of a clarifier in accordance with the present invention.

Referring more particularly to the drawings, the clarifier of the present invention includes an inner or primary settling chamber 10 having a bottom wall 12 which gradually slopes downwardly toward its center and an upstanding circular wall 14. A secondary chamber 16 surrounds the primary chamber 10 and has an outer upstanding wall 18. The secondary chamber 16 has an annular bottom wall 20 which slopes sharply downwardly and inwardly toward the inner circular wall 14. The wall 14 is supported above the bottom wall 20 of the secondary chamber by spaced supports 22, shown as being triangular in form in Fig. 2. Openings 24 in the form of slots extend circumferentially of the wall 14 adjacent its lower portion, as shown in Fig. 1, and between the supports 22.

Figure 2:
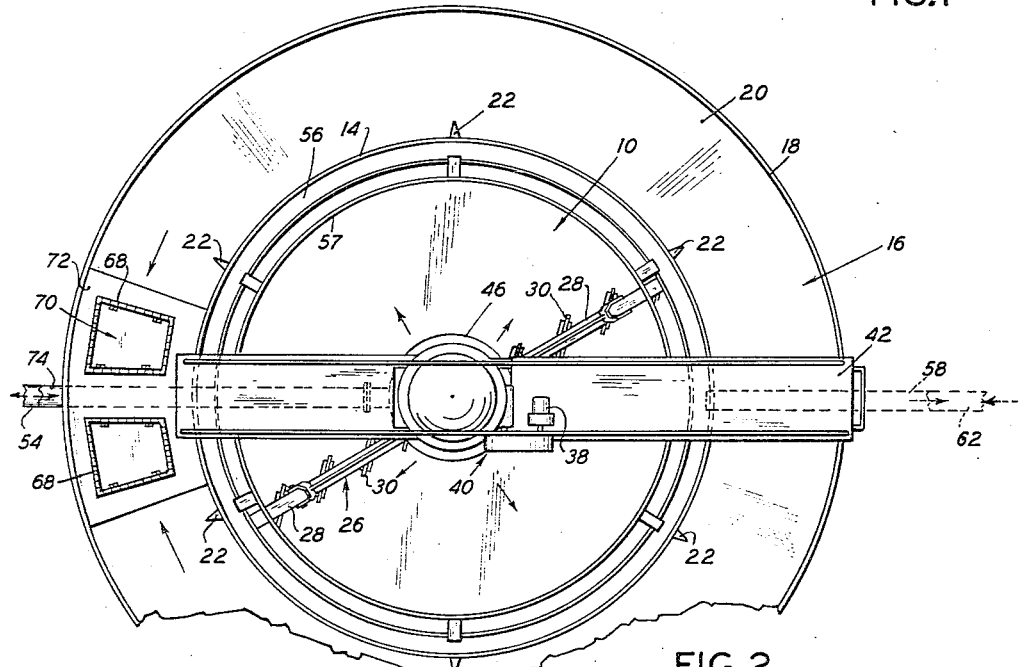
Fig. 2 is a partial plan view of the clarifier of Fig. 1 with the scraping mechanism rotated from the position shown in Fig. 1.

The primary chamber 10 is provided with a known type of scraping mechanism indicated generally at 26, such scraping mechanism including a crosspiece 28 upon which are supported a plurality of spaced scraping elements 30 engaging the bottom wall of the primary settling chamber 10 and angularly positioned as shown in Fig. 2 in order to scrape any sludge deposited on the bottom wall 12 toward a centrally disposed sludge discharge port 32 in the bottom wall 12 of the primary settling chamber when the scraping mechanism is rotated counterclockwise in Fig. 2. The crosspiece 28 also carries a scraping or agitating element 34 extending downwardly into the sludge discharge port 32 and the crosspiece 28 is secured upon a vertically extending shaft 36 having a thrust bearing (not shown) at its upper end. The shaft 36 is slowly rotated by a motor 38 through a speed reducing drive 40 of a known type, the details of which are not shown, such drive conventionally including both a belt drive and a worm drive. The motor 38 and the drive mechanism therefor and the thrust bearing for the shaft 36 are mounted upon a bridge 42 suitably supported upon posts 44 extending upwardly inside the secondary settling chamber immediately adjacent the wall 14 of the primary settling chamber. It will be apparent that the motor 38 may be employed to produce slow rotation of the scraping mechanism 26.

The primary settling chamber 10 is provided adjacent its upper central portion with a primary influent baffle 46 of circular, cylindrical form surrounding and concentric with the shaft 36. The baffle 46 is supported from the bridge 42 by a supporting structure 48 and, as shown in Fig. 1, the baffle 46 may provide a support for a bearing 50 for the shaft 36 and is preferably also provided with a cover 52. Primary influent is introduced into the interior of the baffle 46 through a primary influent pipe 54 extending radially inwardly through the secondary and primary settling chambers 16 and 10, respectively, below the surface of the liquids therein. Settling of suspended solids takes place in the primary settling chamber and such chamber is provided with a circumferential weir 56 extending around its inner periphery adjacent the top of the chamber. Partially clarified primary effluent is discharged over the weir 56 into an annular collecting chamber and thereafter discharged through a primary effluent pipe 58 connected to such collecting chamber. Scum which may collect on the surface of the liquid in the primary chamber is restrained from flowing over the weir 56 by a scum baffle 57 in the form of a ring supported from the weir so as to be radially spaced a short distance inwardly from the weir. Sludge settled in the primary chamber 10 is scraped by the scraper elements of the scraper mechanism 26 into the sludge port 32 and discharged therefrom through a sludge discharge pipe 60.

Secondary influent is introduced into the secondary settling chamber 16 through a secondary influent pipe 62. Such secondary influent pipe 62 preferably terminates in a distributor portion 64 extending radially across the secondary settling chamber and having a plurality of orifices 66 in its opposite sides for directing the secondary influent tangentially of said secondary settling chamber in opposite directions. Such secondary influent flows circumferentially through the secondary chamber in opposite directions around the exterior of the primary settling chamber and is discharged over adjustable weirs 68 into a collecting chamber 70 positioned in the upper portion of the secondary settling chamber 16 opposite the distributor 64. The weirs 68 are supported in openings in the top wall 72 of the collecting chamber 70 so as to be adjustable in height and are preferably notched, as shown most clearly in Fig. 1. The collecting chamber 70 connects with a secondary effluent discharge pipe 74.

Figure 3:
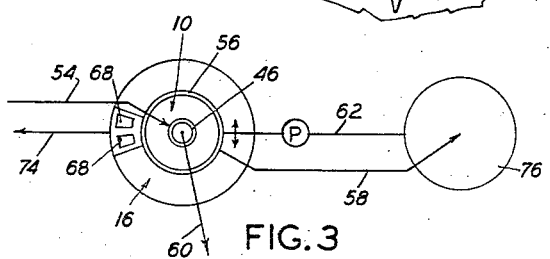
Fig. 3 is a diagrammatic view showing an elementary or simplified system in which the dual clarifier of the present invention may be employed.

A simplified or elementary sewage treatment system is indicated in Fig. 3 and in the system illustrated, primary influent enters the primary chamber through the pipe 54 and baffle 46. Primary effluent is discharged over the weir 56 and from the clarifier through the pipe 58. The primary effluent is sent through a coarse filter 76 and after filtration is returned by pumping as secondary influent through the pipe 62 for a further settling operation in the secondary settling chamber 16. Secondary effluent is discharged from the secondary settling chamber 16 over the weirs 68 and through the pipe 74. Sludge from both of the settling chambers is discharged from the system through the pipe 60. The elementary system, shown in Fig. 3, is for purposes of illustration only and it will be apparent that the dual clarifier of the present invention has utility in more complicated systems involving various recirculation circuits and a greater number of filters, etc.

As stated above, the sludge scraping mechanism 26 may be of any known or suitable type and need be only of sufficient size to scrape the upper surface of the bottom wall of the primary settling chamber 10. In sewage treating plants, the sludge settling in the primary settling chamber is ordinarily sufficiently stiff and compact to resist flowing, such that a scraper mechanism covering the entire floor or bottom wall of the chamber is required. It has been found, however, that the sludge settling in the secondary settling chamber is sufficiently fluid to flow down a surface having an inclination of the order of thirty degrees. The amount of such sludge settled in the secondary settling tank is usually considerably smaller than that settled in the primary settling tank and such sludge will flow down the inclined bottom wall 20 and through the openings 24 thus eliminating the necessity of scraping mechanism in the secondary settling chamber. The triangular form of the supports 22 for the wall 14 with their outwardly directed apexes assist in directing the secondary sludge through the openings 24.

In the structure of the present invention, the scraping mechanism does not extend into the secondary settling chamber from the primary chamber and causes but little mixing of the liquids in the two chambers. The openings 24 between the chambers may therefore be small in vertical height so that the wall 14 between the two chambers effectively isolates the liquids in the chambers. By adjusting the height of the weirs 68 for the secondary effluent, interchange of liquids between the two chambers through the openings 24 can be substantially prevented. By raising or lowering such weirs from the position which prevents such interchange, however, positions of the weirs can be found at which controlled flow from the secondary chamber to the primary chamber, and vice versa, will be obtained.

Although the walls of the various settling chambers may all be made of any suitable material, such as reinforced concrete, an entirely satisfactory structure can be constructed employing walls of metal, such as steel, and such structure is light in weight and more compact and less expensive than a structure which is of reinforced concrete throughout. Also, much less foundation is required as the entire structure of the present invention can be supported on a pair of rings of reinforced concrete, i. e., an inner ring 78 and an outer ring 80, the bottom wall 12 of the inner chamber resting directly upon the ground or upon a gravel or sand fill, and the outer wall 18 of the outer or secondary settling chamber 16 being supported at its outer periphery upon a plurality of posts 82 set in the outer ring 80. Since a smooth concrete surface provides a desirable bottom surface for engagement by the scraper elements 30, the inner or upper surface of the bottom wall 12 of the primary settling chamber 10 is preferably provided with a protecting layer of cement grout or concrete 84 made with Portland cement and a fine aggregate.

I claim:

1. A clarifier comprising a bottom wall and an upstanding inner wall forming a primary settling chamber, an upstanding outer wall surrounding and spaced from said inner wall and a bottom wall extending between said outer wall and said inner wall to form a secondary settling chamber surrounding said primary chamber, means for introducing primary influent into one portion of said primary chamber and discharging primary effluent from another portion of said primary chamber, means for discharging sludge from the bottom of said primary chamber, scraping means for scraping primary sludge deposited on the bottom wall of said primary chamber into said means for discharging sludge, means for introducing secondary influent into one portion of said secondary chamber and discharging secondary effluent from another portion of said secondary chamber, said inner wall having openings in its lower portion providing communication between said chambers, said bottom wall of said secondary chamber sloping downwardly toward said openings to cause secondary sludge settled in said secondary chamber to flow toward and through said openings and onto said bottom wall of said primary chamber so as to be scraped with said primary sludge by said scraping means into said means for discharging sludge.

2. A clarifier comprising a bottom wall and an upstanding circular inner wall forming a primary settling chamber, an upstanding outer wall surrounding and spaced from said inner wall and a bottom wall extending between said inner wall and said outer wall to form a secondary settling chamber surrounding said primary chamber, means for introducing primary influent into the central portion of said primary chamber and discharging primary effluent from the upper peripheral portion of said primary chamber, means for discharging sludge from the central portion of the bottom of said primary chamber, rotary scraping means for scraping primary sludge deposited on the bottom wall of said primary chamber into said means for discharging sludge, means for introducing secondary influent into one portion of said secondary chamber and discharging secondary effluent from the upper part of another portion of said secondary chamber, said inner wall having circumferential extending openings in its lower portion providing communication between said chambers, said bottom wall of said secondary chamber sloping downwardly toward said openings to cause secondary sludge settled in said secondary chamber to flow toward and through said openings and onto said bottom wall of said primary chamber so as to be scraped with said primary sludge by said scraping means into said means for discharging sludge.

3. A clarifier comprising a bottom wall and an upstanding circular inner wall forming a circular primary settling chamber, an upstanding circular outer wall surrounding and spaced from said inner wall and a bottom wall extending between said circular wall and said outer wall to form an annular secondary settling chamber surrounding said primary chamber, means for introducing primary influent into the central portion of said primary chamber and discharging primary effluent from the upper peripheral portion of said primary chamber, means for discharging sludge from the bottom of said primary chamber, rotary scraping means for scraping primary sludge deposited on the bottom wall of said primary chamber into said means for discharging sludge, means for introducing secondary influent substantially tangentially into one portion of said annular secondary chamber and discharging secondary effluent from a diametrically opposed upper portion of said secondary chamber, said inner wall having circumferentially extending slots in its lower portion providing communication between said chambers adjacent said bottom wall of said secondary chamber, said bottom wall of said secondary chamber sloping downwardly toward said openings to cause secondary sludge settled in said secondary chamber to flow toward and through said openings and onto said bottom wall of said primary chamber so as to be scraped with said primary sludge into said means for discharging sludge.

4. A clarifier comprising a bottom wall and an upstanding circular inner wall forming a circular primary settling chamber, an outer upstanding wall surrounding and spaced from said inner wall and a bottom wall extending between said circular wall and said outer wall to form a secondary settling chamber surrounding said primary chamber, means for introducing primary influent into the central portion of said primary chamber, a weir extending around the upper periphery of said inner wall for discharging primary effluent from said primary chamber, means for discharging sludge from the bottom of said primary chamber, scraping means for scraping primary sludge deposited on the bottom wall of said primary chamber into said means for discharging sludge, means for introducing secondary influent into one portion of said secondary chamber and means for discharging secondary effluent from another portion of said secondary chamber, said inner wall having circumferentially extending slots in its lower portion providing communication between said chambers, said bottom wall of said secondary chamber sloping downwardly toward said openings to cause secondary sludge settled in said secondary chamber to flow toward and through said openings and onto said bottom wall of said primary chamber so as to be scraped with said primary sludge into said means for discharging sludge, and said means for discharging secondary effluent from said secondary chamber including a weir of adjustable height to control the flow of liquids between said chambers through said slots.

No references cited.